United States Patent [19]
Seko et al.

[11] 4,209,369
[45] Jun. 24, 1980

[54] PROCESS FOR ELECTROLYSIS OF SODIUM CHLORIDE BY USE OF CATION EXCHANGE MEMBRANE

[75] Inventors: Maomi Seko, Tokyo; Shinsaku Ogawa; Reiji Takemura, both of Nobeoka, all of Japan

[73] Assignee: Asahi Kasei Kogyo Kabushiki Kaisha, Osaka, Japan

[21] Appl. No.: 969,272

[22] Filed: Dec. 14, 1978

[30] Foreign Application Priority Data

Dec. 19, 1977 [JP] Japan ................. 52-151663

[51] Int. Cl.$^2$ ............................ C25B 1/16; C25B 1/26
[52] U.S. Cl. ...................................... 204/98; 204/128
[58] Field of Search .............................. 204/98, 128

[56] References Cited

U.S. PATENT DOCUMENTS

| | | | |
|---|---|---|---|
| 3,976,549 | 8/1976 | Falvo | 204/98 |
| 4,036,713 | 7/1977 | Brown | 204/98 |
| 4,090,932 | 5/1978 | Kazihara et al. | 204/98 |
| 4,123,336 | 10/1978 | Seko et al. | 204/296 |

*Primary Examiner*—R. L. Andrews
*Attorney, Agent, or Firm*—Birch, Stewart, Kolasch and Birch

[57] ABSTRACT

In a process for electrolysis of sodium chloride in an electrolytic cell divided into the anode chamber and the cathode chamber by a cation exchange membrane, well brine is used as the starting material for the electrolysis and the dilute aqueous sodium chloride solution formed as the result of the electrolysis is subjected to concentration for re-use as the starting material.

10 Claims, 9 Drawing Figures

PROCESS FOR ELECTROLYSIS OF SODIUM CHLORIDE BY USE OF CATION EXCHANGE MEMBRANE

This invention relates to a process for producing an aqueous caustic soda solution and chlorine by electrolysis of well brine or a dilute agueous solution thereof in an electrolytic cell having a cation exchange membrane interposed between anode and cathode. The "well brine" herein used refers to the approximately saturated aqueous sodium chloride solution pumped up from underground rock salt stratum.

In the art for production of an aqueous caustic soda solution and chlorine by electrolysis of an aqueous sodium chloride solution, there have been known the mercury process, the diaphragm process and the ion-exchange membrane process. As starting materials to be employed in these processes, there are solid sodium chloride and well brine. From the standpoint of commercial application, less expensive well brine is evidently more advantageous.

In the diaphragm process, an aqueous sodium chloride solution fed into the anode chamber is transported through the diaphragm into the cathode chamber, wherefrom a mixture containing caustic soda is formed and unelectrolyzed sodium chloride is taken out. The unelectrolyzed sodium chloride is precipitated as crystals and recovered in the course of concentrating the caustic soda. As the result, effective utilization of the starting materials is rather easy.

On the other hand, in the mercury process, a part of the sodium chloride fed into the electrolytic cell is electrolyzed into chlorine and sodium amalgam. The aqueous sodium chloride solution lowered in concentration, namely a dilute aqueous sodium chloride solution, is discharged as it is from the electrolytic cell. As methods for effective utilization of this dilute aqueous sodium chloride solution, there may be mentioned (1) a method wherein solid sodium chloride is supplemented in an amount corresponding to the amount electrolyzed to the dilute aqueous sodium chloride solution to make up a saturated sodium chloride solution which is in turn circulated to the electrolytic cell; (2) a method wherein the dilute aqueous sodium chloride solution is returned to the well and pumped up again as a saturated aqueous sodium chloride solution therefrom to be circulated to the electrolytic cell; and (3) a method wherein the dilute aqueous sodium chloride solution is concentrated before being circulated into the electrolytic cell. According to the method (2), when the well is located at a long distance from the electrolysis plant, the cost necessary for piping for returning the aqueous sodium chloride solution is enormous to the point of an economical disadvantage. In addition, impurities such as calcium chloride, magnesium chloride, sodium sulfate or others in the well are dissolved again in the aqueous sodium chloride solution, whereby the cost necessary for purification of the aqueous sodium chloride solution is disadvantageously increased. The method (3) is impossible from an economical standpoint, because a considerable amount of heating from outside is required. Thus, in most cases in the absence of exceptional favorable conditions of location, the method (1) is the only one left to be practically used.

In the ion-exchange membrane process, the cation exchange membrane is dense enough to permit no electrolyte to permeate therethrough. As the result, there occurs no transportation of the aqueous sodium chloride solution from the anode chamber to the cathode chamber, but the aqueous sodium chloride solution fed into the anode chamber is electrolyzed therein and the dilute sodium chloride solution lowered in concentration is discharged as it is from the anode chamber. That is, there is no chance for recovery as crystals in the course of concentrating the caustic soda as in the diaphragm process as mentioned above. For this reason, for effective utilization of sodium chloride, it has been considered convenient to adopt the method (1) which is suitable for the mercury process.

Under the circumstances as described above, electrolysis of sodium chloride on a commercial scale using well brine has been practiced for the most part by the diaphragm process.

Whereas, the ion-exchange membrane process has the specific features that a considerable amount of the water fed into the anolyte system migrates through the cation exchange membrane as hydrated water on sodium ions into the catholyte system and also that the electric resistance of the cation exchange membrane is greater to cause greater amount of heat generation in the electrolytic cell.

The present invention has been accomplished with due considerations about the specific features as mentioned above. The present invention is intended for effective utilization of the feed aqueous sodium chloride solution by concentrating the dilute sodium chloride solution with a small amount of energy, even without consumption of special energy required from the outside.

An object of the present invention is to employ the well brine which is less expensive as the starting sodium chloride without use of return piping to the well.

Another object of the present invention is to reduce the cost necessary for purification of the aqueous sodium chloride solution.

Still another object of the present invention is to recover the heat generated in the electrolytic cell and also to maintain the temperature in the electrolytic cell at an appropriate temperature.

According to the present invention, there is provided a process for electrolysis of an aqueous sodium chloride solution in an electrolytic cell divided into an anode chamber and a cathode chamber by a cation exchange membrane between the anode and the cathode by carrying out electrolysis at 50° C. or higher while feeding the sodium chloride solution into the anode chamber and producing an aqueous sodium hydroxide solution from the cathode chamber and chlorine gas from the anode, respectively, wherein there is used purified well brine or a dilute aqueous solution thereof as the feed sodium chloride solution, and wherein a part of the dilute sodium chloride solution after being depleted in sodium chloride concentration to a value in the range from 100 to 250 g/liter is withdrawn from the anolyte circulation system, concentrated to a concentration ratio in the range from 1.05 to 3.00 and thereafter returned to said anolyte circulation system.

The "dilute aqueous sodium chloride solution" herein mentioned refers to the aqueous sodium chloride solution subjected to electrolysis in the anode chamber and depleted in sodium chloride concentration or the aqueous sodium chloride solution depleted in sodium chloride concentration which is circulated between the anode chamber and the anolyte circulation tank.

In the present invention, the dilute aqueous sodium chloride solution is concentrated as a rule by evaporation utilizing the heat generated in the electrolytic cell. Such a method is made available in the ion-exchange process, because the amount of the water to be evaporated is smaller and the amount of the heat generated is greater than in the mercury process as previously explained. However, is some cases when the amount of the heat is insufficient, when it is difficult to provide an effective temperature difference or when the heat generated in the electrolytic cell is utilized for other purposes such as concentration of caustic soda, etc., it is also possible to substitute all or a part of the heat source by other heat sources such as boiler steam. In such cases, dialysis concentration by use of ion-exchange membranes may also conveniently be available.

Any conventionally used concentration device may be utilized in the present invention without limitation. Suitably, however, multi-stage flash evaporators and multiple-effect evaporators may preferably be used. From the standpoint of effective utilization of the heat generated in the electrolytic cell, multi-stage flash evaporators for which an effective temperature difference can easily be taken are particularly preferred. This is because the temperature in the electrolytic cell is relatively lower when considered as a heating source, while the boiling point raising of the dilute aqueous sodium chloride solution is increased with an increased degree of concentration.

In order to achieve the objects of the present invention, it is of course preferred to carry out the electrolysis at a temperature as high as possible. For practicing the present process more effectively, the electrolysis temperature should be 50° C. or higher, preferably 70° C. or higher. But, at too high a temperature, the electrolytes undergo boiling resulting in an increase in the inter-electrode resistance, whereby the electrolysis voltage may abruptly be increased. For this reason, the upper limit of the preferable electrolysis temperature is 120° C.

The concentration of the dilute aqueous sodium chloride solution subjected to evaporation concentration in the present invention is required to be from 100 to 250 g/liter, preferably from 140 to 210 g/liter. If the concentration in the dilute aqueous sodium chloride solution is too low, the electrolysis voltage is too high. On the contrary, with too high a concentration, the amount of sodium chloride diffused into the cathode chamber is increased, whereby the purity of the caustic soda product is lowered.

The concentration of the aqueous sodium chloride solution to be returned to the electrolytic cell after concentration may suitably be selected so as to be at a minimum cost by balancing the concentration installation cost and the energy cost necessary for concentration. But it is critical that the solution should be unsaturated. When the concentration reaches saturation, there may occur precipitation of sodium chloride in the concentration device, thereby lowering the thermal efficiency or worsening the state of liquid flow.

As the cation exchange membranes to be employed in the present invention, there may be used any cation exchange membrane which is resistant to chlorine gas generated in the anode chamber and has a large transport number of sodium ions. In particular, cation exchange membranes having high permeability of water are preferred. Various characteristics of the cation exchange membranes such as water permeability, and voltage or current efficiency depend on the ion-exchange groups possessed by the membranes. The membranes having sulfonic acid groups are greater in water permeability and therefore may advantageously be used, since the amount of water to be removed by the present process can be decreased. However, the membranes having sulfonic acid groups as ion-exchange groups are poorer in transport number of sodium ions so as to lower the current efficiency for formation of the caustic soda. For improvement of current efficiency for formation of the caustic soda, weakly acidic groups such as carboxylic acid groups, phosphoric acid groups or sulfonamide groups are more advantageous. But, the membranes having these ion-exchange groups will suffer from a decrease in water permeability to result in an increase in an amount of water to be evaporated. When there is provided a thin layer carrying pendant weakly acidic groups on the cathode side of the membrane having sulfonic acid groups, however, the resultant membrane has water permeability comparable to the membrane having only sulfonic acid groups, while its current efficiency becomes increased similarly as the membrane having weakly acidic groups. The cation exchange membranes having such a constitution are especially preferred in the practice of the present invention. The water permeability of the membrane is 50 g or more per current passage of one Faraday, preferably 70 g or more. The transport number of sodium ions of the membrane is 0.8 or more, preferably 0.9 or more.

In the well brine to be employed in the present invention, there generally exist impurities such as calcium chloride, magnesium chloride, sodium sulfate, etc. dissolved therein. These impurities may be gradually accumulated in the cation exchange membranes or on the surface thereof to cause a voltage increase or breaking of the membranes. Accordingly, the well brine to be used in the present invention is required to be purified prior to electrolysis in order to remove these impurities as much as possible (preferably to a concentration of 0.1 ppm or less). If there is accumulation of the impurities in the concentrated aqueous sodium chloride solution which is recovered, such recovered concentrated solution recovered may also be subjected to purification. The purification may preferably be conducted by, after being subjected to conventional means such as removal of precipitates by chemical reagents, removing polyvalent metal ions such as calcium, magnesium, iron or others in a chelate resin tower. That is, the feed sodium chloride solution is first subjected to crude purification for removal of precipitates by use of chemical reagents and thereafter conveyed together with the concentrated aqueous sodium chloride solution recovered into the chelate resin tower, wherein calcium, magnesium, iron or others are thoroughly removed. By conducting such a treatment, the capacity of a thickener can be reduced. Furthermore, by utilizing the feed aqueous sodium chloride solution as a part of the cooling source for cooling the concentration device, it can be heated before being conveyed into the purification step, whereby the reaction rate can advantageously be accelerated.

In carrying out the electrolytic process according to the present invention, water may be added, if desired, to the cathode chamber. But, from the spirit of the present invention, it is preferred to add no water to the cathode chamber.

The purified well brine may be fed into the anode chamber as it is in the present invention, or it may be adjusted to a desired concentration by mixing with the dilute aqueous sodium chloride solution before is it fed into the anode chamber.

According to the process of the present invention, the utilization percentage of sodium chloride in the feed well brine can be as high as 100%, and therefore the quantity of chemical reagents can be reduced to a great extent and the purification equipment can be made smaller.

In the ion-exchange membrane process, without removal of the heat generated in the electrolytic cell, the electrolyte will ultimately undergo boiling to cause breaking of the cation exchange membranes or an increase in the required voltage through an increase in inter-electrode resistance. According to the process of the present invention, the dilute aqueous sodium chloride solution at a high temperature is withdrawn and the concentrated aqueous sodium chloride solution recovered after being cooled through evaporation concentration is returned to the electrolytic cell, whereby the temperature of the electrolytic cell can be maintained at a suitable value. Even when the electrolysis voltage may be raised by increasing the current density, its energy can be utilized effectively for concentration of the dilute aqueous sodium chloride solution. Thus, the electrolytic cell can be operated very economically even at a high current density.

The present invention may be better understood with reference to the accompanying drawings showing typical embodiments of the process according to the present invention, which are set forth only for illustrative purposes and should not be considered as limitative of the invention.

In the accompanying drawings.

Figure 1:
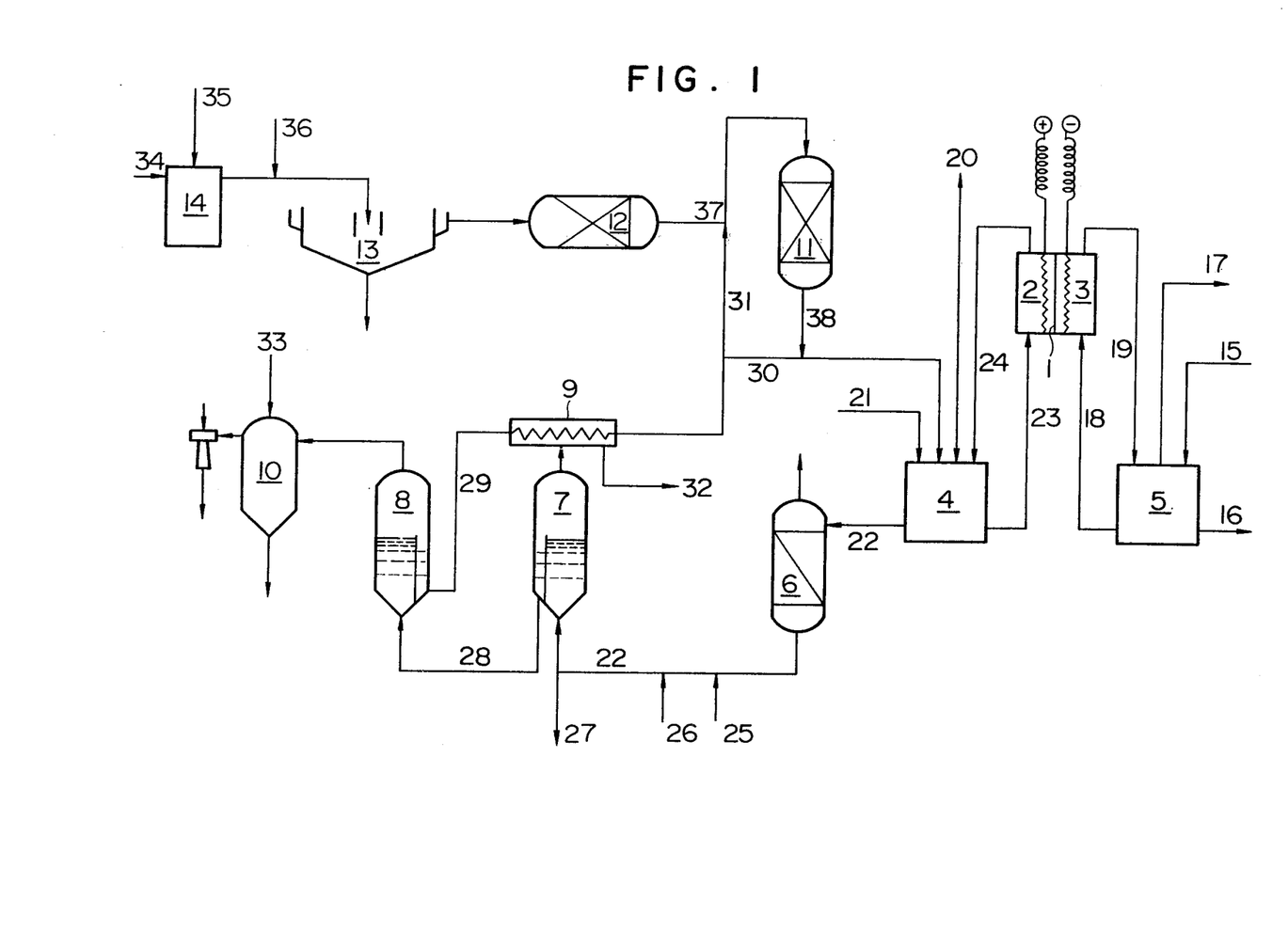
FIG. 1, FIG. 2, FIG. 3, FIG. 4 and FIG. 5 show typical flow sheets for practicing the process of the invention.

In FIG. 1, 1 shows a cation exchange membrane, 2 the anode chamber of an electrolytic cell, 3 the cathode chamber of an electrolytic cell, 4 the anolyte circulation tank, 5 the catholyte circulation tank, 6 the dechlorination tower, 7 and 8 flash evaporators, 9 and 10 condensers, 11 the chelate resin tower, 12 the filter, 13 the thickener and 14 the reactor.

There is formed the circulation line by lines 18 and 19 between the cathode chamber 3 of an electrolyte cell and the catholyte circulation tank. An aqueous caustic soda solution adjusted to a certain concentration with addition of water from line 15, if necessary, is circulated between the cathode chamber 3 of the electrolytic cell and the catholyte circulation tank 5. From the line 16 is withdrawn the aqueous caustic soda solution formed, while from the line 17 is withdrawn the hydrogen gas formed after gas-liquid separation in the catholyte circulation tank 5. Water may be added to the line 18 in place of the catholyte circulation tank 5. In this case, a more concentrated aqueous caustic soda solution can be withdrawn from the line 16.

The lines 23 and 24 show circulation lines between the anode chamber of the electrolytic cell and the anolyte circulation tank 4. From line 20 is withdrawn the chlorine gas formed after gas-liquid separation in the anolyte circulation tank 4. If necessary, hydrochloric acid is added through the line 21 in order to adjust the pH of the circulated liquid in the anode chamber. Hydrochloric acid may be added to the line 23 in place of the anolyte circulation tank 4. In this case, the pH in the anolyte circulation tank can be maintained at a higher value. Especially when it is necessary to effect neutralization during the procedure of concentration of the dilute aqueous sodium chloride solution, hydrochloric acid from the line 21 is preferably added to the line 23. A part of the dilute aqueous sodium chloride solution is withdrawn from the line 22 and conveyed to the concentration step. The feed aqueous sodium chloride solution and the recovered concentrated aqueous sodium chloride solution are fed through the line 30 into the anolyte circulation tank 4. They may be added from the line 30 to the line 23. Especially, when the amount withdrawn from the line 22 is small and the concentration ratio is high, the feed solutions from the line 30 may preferably be supplied into the line 23, since the concentration of the dilute aqueous sodium chloride solution withdrawn from the line 22 can be made lower.

The dilute aqueous sodium chloride solution withdrawn from the line 22 is subjected to dechlorination in the dechlorination tower 6 before being conveyed to the flash evaporator 7. If necessary, there is added sodium sulfite, caustic soda, etc. from the lines 25 and 26 for elimination of residual chlorine or pH adjustment. A part of the dilute aqueous sodium chloride solution is subjected to blow down from the line 27, if necessary, for the purpose of suppressing the concentration of impurities accumulated in the dilute aqueous sodium chloride solution at a constant value. The dilute aqueous sodium chloride solution after being concentrated by flash evaporation in the evaporator 7 is conveyed through the line 28 to the second flash evaporator 8, wherein it is further concentrated by flash evaporation. The vapors generated in the flash evaporator 7 are condensed by cooling in the condenser 9 and the condensed water is withdrawn from the line 32. To the cooling source for the condenser 9 is supplied the concentrated aqueous sodium chloride solution cooled to a lower temperature through further flash evaporation in the second flash evaporator 8 from the line 29. The vapors generated in the second flash evaporator 8 are condensed in the condenser 10 under cooling with the cooling water 33. As the condenser 10, a barometric condenser may preferably be used. The recovered concentrated aqueous sodium chloride solution heated through condensation of the vapors generated in the flash evaporator 7 in the condenser 9 is returned through the line 30 to the anolyte circulation tank 4. If necessary, it may be returned to the anolyte circulation tank via the line 31 through the chelate resin tower 11 to remove impurities such as calcium, magnesium, iron, etc. accumulated in the anolyte therein.

The line 34 is the feed line for feeding the starting aqueous sodium chloride solution. The aqueous sodium chloride solution fed through the line 34 is treated, if necessary, with caustic soda, sodium carbonate, barium carbonate, etc. added from the line 35 for the purpose of removing calcium, magnesium, iron, sulfate ions, etc. Further, after adding a precipitating agent from the line 36 to the solution, it is conveyed to the thickener 13. The aqueous sodium chloride solution, from which impurities such as calcium, magnesium, iron, etc. are removed in the thickener 13 as calcium carbonate, magnesium hydroxide, iron hydroxide, etc., is conveyed then to the filter 12. The aqueous sodium chloride solution coming out from the filter is combined, if necessary, with a part or all of the recovered concentrated aqueous sodium chloride solution from the line 31 and thereafter conveyed to the chelate resin tower 11. The aqueous sodium chloride solution purified to 0.1 ppm or less of the impurities such as calcium, magnesium, iron, etc. in the chelate resin tower is incorporated through the line 38 into the recovered concentrated aqueous sodium chloride solution and supplied into the anolyte circulation tank 4. The line 31 may alternatively be connected to the line 34, thereby also effecting purification of the recovered concentrated aqueous sodium chloride solution at the same time in the thickener. In this case, the volume of the thickener is required to be increased, but blow down from the line 27 is unnecessary.

Figure 2:
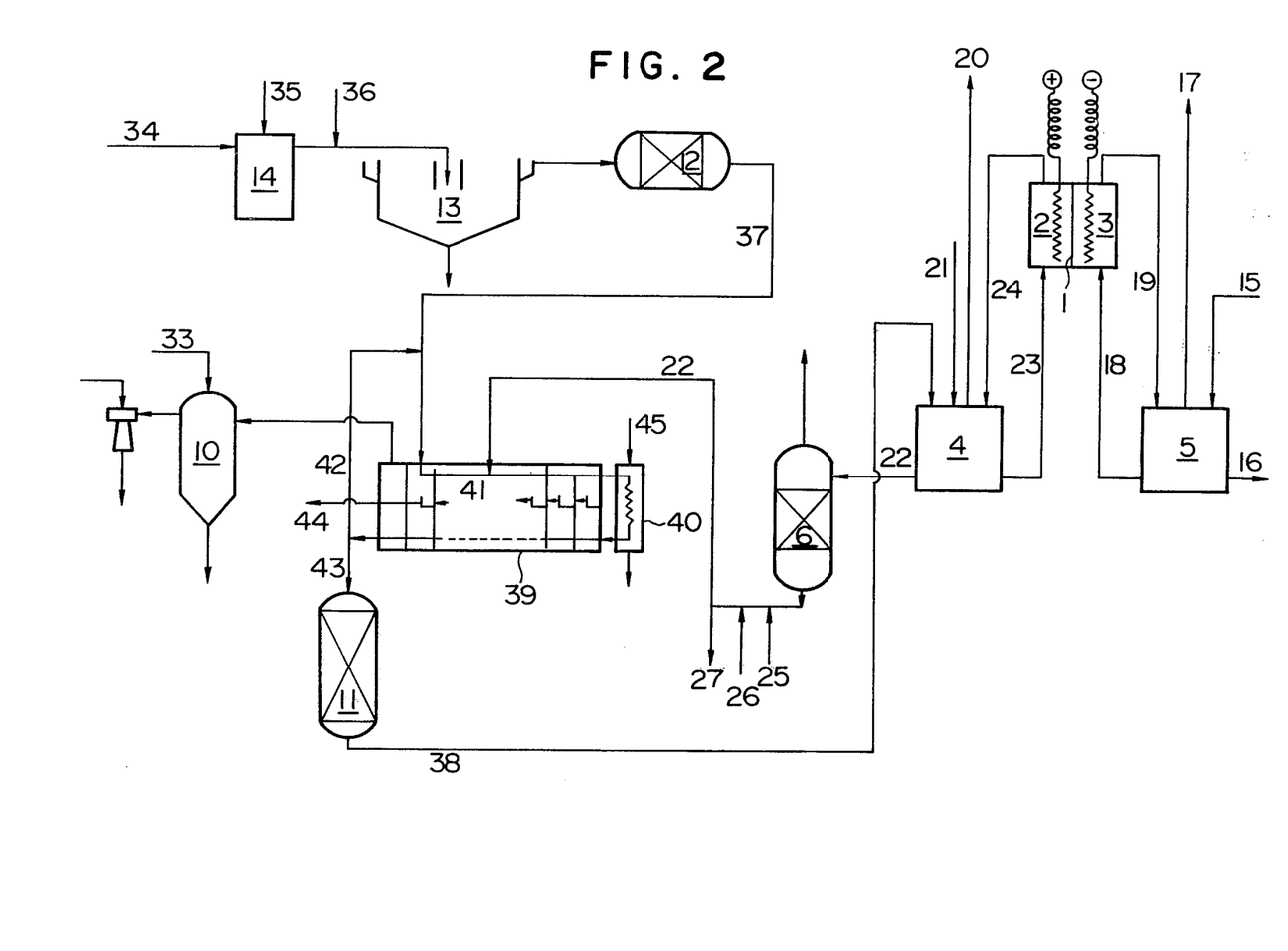

Referring now to FIG. 2, there is shown one example of a multi-stage flash system using the feed aqueous sodium chloride solution and the dilute aqueous sodium chloride solution as cooling source, in which the numerals correspond to those in FIG. 1. In addition, there are the multi-stage flash evaporator 39, the steam heater 40 and the cooling condensing pipe 41.

The feed aqueous sodium chloride solution line 37 from the filter 12 is connected to the cooling condensing pipe 41 of the multi-stage flash evaporator 39. The feed aqueous sodium chloride solution is elevated to a higher temperature by recovering the heat while condensing the vapors generated in each stage of the evaporator 39. Further, the dilute aqueous sodium chloride solution line 22 is connected to the stage, from which it is possible to take an effective temperature difference with the dilute aqueous sodium chloride solution as a cooling source, whereby it is elevated to a higher temperature while condensing the vapors generated in each stage. The pre-heated feed aqueous sodium chloride solution and dilute aqueous sodium chloride solution are further heated with boiler steam 45 by means of the steam heater 40 before they are conveyed successively to flash chambers in respective stages. The aqueous sodium chloride solution subjected to concentration and cooling in the multi-stage flash evaporator 39 is conveyed through the line 43 to the chelate resin tower 11, wherein polyvalent metal ions are thoroughly removed, and thereafter conveyed through the line 38 to the anolyte circulation tank 4. A part of the aqueous sodium chloride solution subjected to concentration cooling is combined in the line 42 with the feed aqueous sodium chloride solution from the line 37 and circulated as a cooling source for the multi-stage flash evaporator 39. The vapors from the first stage and, if necessary, from the second stage are cooled in the barometric condenser 10 with the cooling water 33 to be condensed. The water condensed in each stage is discharged from the line 44. In this drawing, the feed aqueous sodium chloride solution is shown to be fed from the line 37 into the cooling condensing pipe 41. Alternatively, it may be fed through the line 34 and elevated to a higher temperature in the pipe 41 before being returned to the reactor 14. In this case, purification of the aqueous sodium chloride solution may advantageously be carried out at a higher temperature. In the embodiment as shown in FIG. 2, there is employed boiler steam as a part of the heating source, but the latent heat of the vapors generated in each stage are utilized for preheating of the liquids fed into the flash chambers to result in a very good thermal efficiency. Thus, this embodiment is suitable when heat generation in the electrolytic cell is insufficient or when the heat generated is otherwise utilized. When the heat generated in the electrolytic cell is utilized for other purposes, the line 43 may be connected to a stage at a suitable temperature in place of the first stage.

Figure 3:
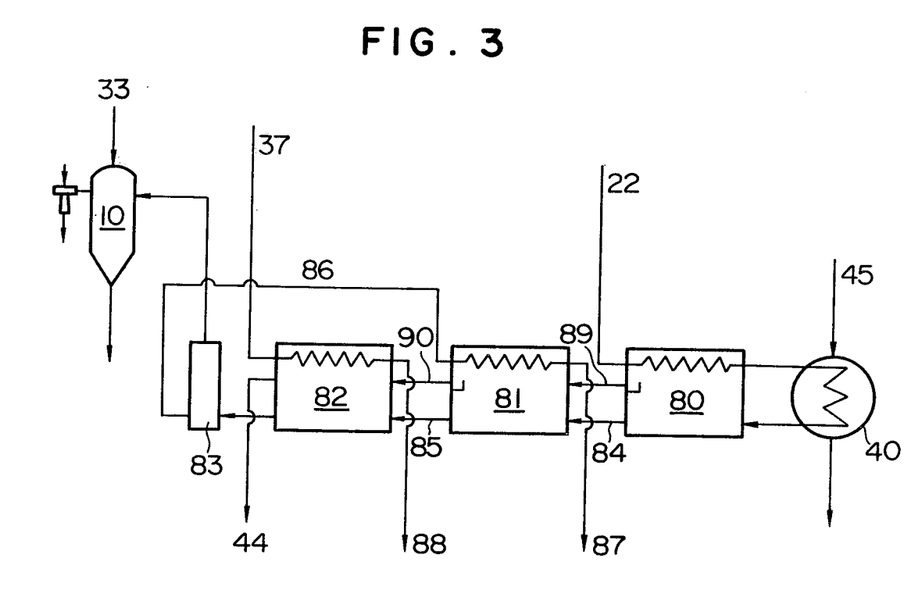

Referring to FIG. 3, there is shown another example of a multi-stage flash system suitable for the present invention. In FIG. 3, only the concentration system is shown, other parts being the same as shown in FIG. 2. The multi-stage flash evaporator is divided into the high temperature zone 80, the medium temperature zone 81 and the low temperature zone 82. As cooling source for the respective condensing zones, there are employed the dilute aqueous sodium chloride solution, the recovered concentrated aqueous sodium chloride solution and the feed aqueous sodium chloride solution, respectively. A part of the dilute aqueous sodium chloride solution is conveyed to the condenser in the high temperature zone 80 to be pre-heated therein. The pre-heated dilute aqueous sodium chloride solution is further heated in the steam heater 40 and thereafter fed into the evaporation chamber in the high temperature zone. The dilute aqueous sodium chloride solution subjected to evaporation concentration in the high temperature zone is conveyed successively through the lines 84 and 85 to the evaporation chambers in the medium temperature zone 81 and the low temperature zone 82. The dilute aqueous sodium chloride solution cooled to a lower temperature after evaporation concentration, namely the recovered concentrated aqueous sodium chloride solution is fed through the line 86 into the condenser in the medium temperature zone, wherein it is elevated to a higher temperature by heat recovery, and then returned through the line 87 to the anolyte circulation tank. If necessary, the recovered solution may be passed to the chelate resin tower for removal of accumulated impurities such as calcium, magnesium or iron before it is returned to the anolyte circulation tank. The feed aqueous sodium chloride solution subjected to crude purification is fed through the line 37 into the condenser in the low temperature zone and, after being elevated to a higher temperature by heat recovery, conveyed through the line 88 into the chelate resin tower for thorough purification before it is fed into the anolyte circulation tank. The vapors generated in the first stage 83 in the multi-stage flash evaporator are condensed by cooling in the barometric condenser 10 with cooling water 33. The waters condensed in the condensers in 80, 81 and 82 are collected by the lines 89 and 90 and discharged through the line 44. According to this flow, wherein there is no circulation of the aqueous sodium chloride solution in the multi-stage flash evaporator but the aqueous sodium chloride solution is returned by one-pass to the anolyte circulation tank, the amount of the solution circulated between the multi-stage flash evaporator and the anolyte circulation tank is increased. However, since the concentration of the aqueous sodium chloride solution in the multi-stage flash evaporator is lowered and therefore the boiling point of the solution is lowered, it is easier to take an effective temperature difference corresponding to the lowered concentration. Accordingly, it is possible to make the heat transmission area or the number of flash stages smaller.

Figure 4:
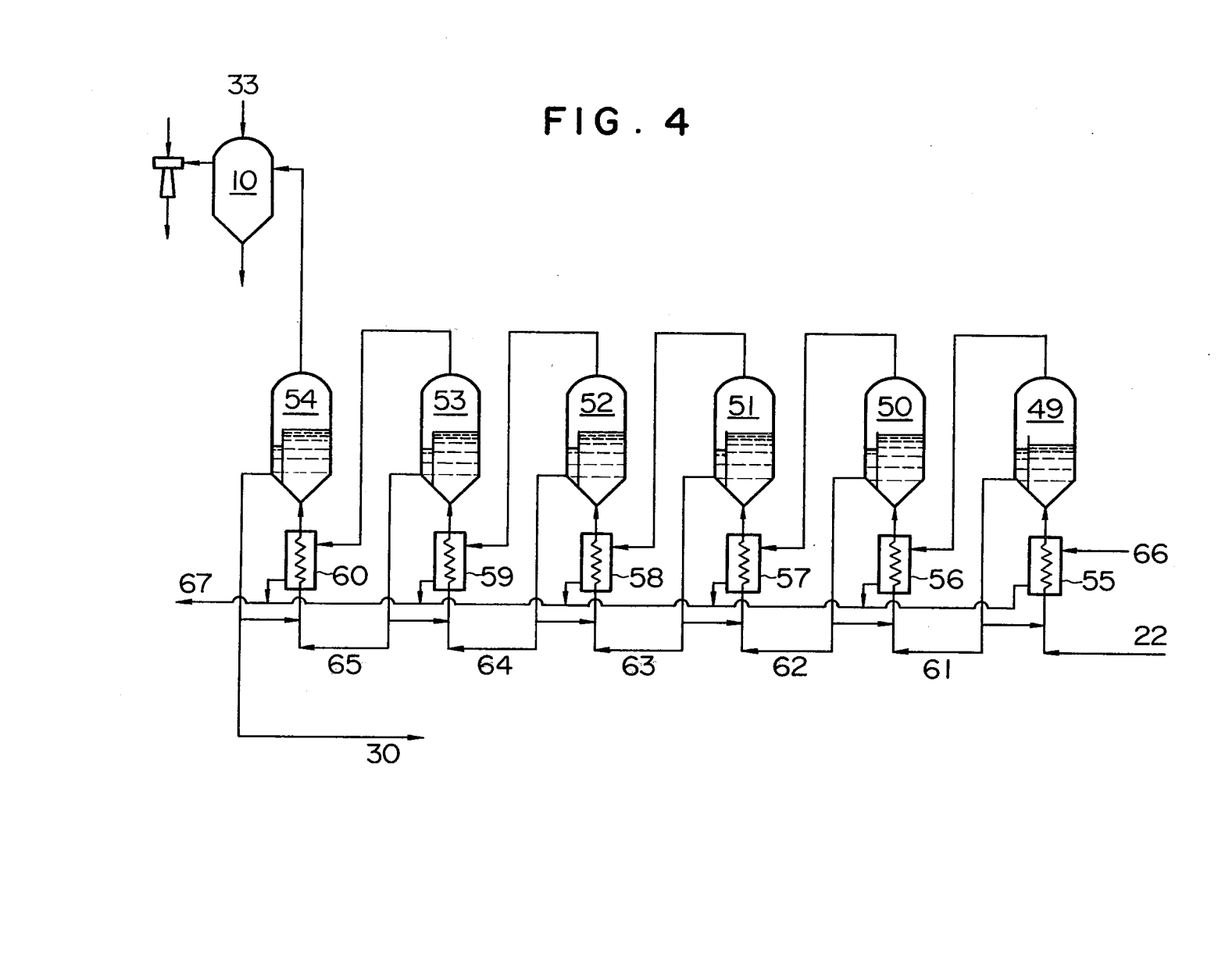

In place of the two-stage flash evaporator as shown in FIG. 1, it is also possible to use a multiple-effect evaporator. In FIG. 4, there is shown the embodiment wherein a six-effect evaporator is employed. FIG. 4 shows only the concentration system, being otherwise the same as shown in FIG. 1. The evaporators for respective effects are shown by 49, 50, 51, 52, 53 and 54 and the heaters for respective evaporators by 55, 56, 57, 58, 59 and 60. The dilute aqueous sodium chloride solution, after being heated with boiler steam 66 in the heater 55, is fed through the line 22 into the first effect evaporator 49 and subjected to evaporation concentration therein. Then, after being subjected to further evaporation concentrations successively in the evaporators of respective effects fed through the lines 61, 62, 63, 64 and 65 via respective heaters, the resultant concentrated solution is returned as the recovered concentrated aqueous sodium chloride solution through the line 30 into the anolyte circulation tank. The vapors generated in the evaporator of each effect are utilized as the heating source for heating the evaporator of subsequent effect and the condensed water is discharged through the line 67. This kind of a multiple-effect evaporator is high in thermal efficiency, since the vapor generated in respective effects is utilized for heating the evaporator of subsequent effects. Such an evaporator may effectively be used when the heat generated in the electrolytic cell is used for other purposes or insufficient in amount, as explained similarly with reference to the embodiment of FIG. 2. When the amount of the heat generated is sufficient, the electrolytic cell may be used as heat source for the first effect evaporator 49 without provision of the heater 55, thereby permitting circulation between the first effect evaporator 49 and the anolyte circulation tank 4. In this case, the temperature in the first effect evaporator is lowered and therefore the number of the effects is required to be two or three.

Figure 5:
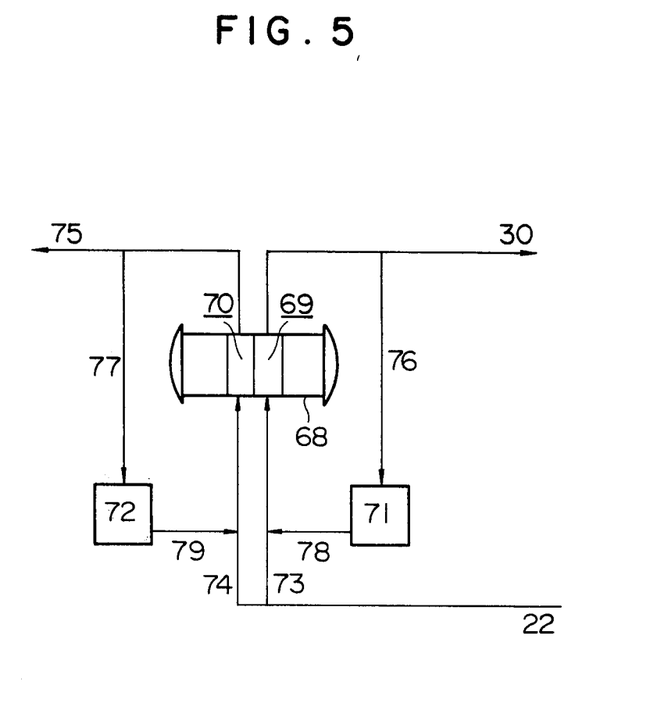

When the heat generated in the electrolytic cell is utilized for other purposes and there is no need to remove the heat generated in the electrolytic cell during the procedure of concentrating the dilute aqueous sodium chloride solution, there may also effectively be employed electrodialysis concentration by using ion-exchange membranes. Such an embodiment is shown in FIG. 5, wherein only the concentration system is shown, being otherwise the same as in FIG. 1. The electrodialysis cell 68 has concentration chambers 69 and dilution chambers 70. Between the concentration chambers 69 and the concentrated solution circulation tank 71 is formed the circulation line by the lines 76 and 78; there is also the circulation line between the dilution chambers 70 and the diluted solution circulation tank 72 formed by the lines 77 and 79. The dilute aqueous sodium chloride solution conveyed from the line 22 is fed through the line 73 into the concentration chambers and through the line 74 into the dilution chambers, respectively. The dilute aqueous sodium chloride solution fed into the concentration chambers, after recovering the sodium chloride in the dilute aqueous sodium chloride solution fed into the dilution chambers, is returned as the recovered concentrated aqueous sodium chloride solution through the line 30 to the anolyte circulation tank. The dilute aqueous sodium chloride solution fed into the dilution chambers and lowered in concentration therein is subjected to blow down from the line 75. The sodium chloride concentration in the diluted solution is determined so as to satisfy minimum cost requirements while balancing the utilization percentage of sodium chloride and consumption of electrodialysis power, but generally in the range from 0.5 to 3.0 %. According to this embodiment, impurities slightly mixed in the feed aqueous sodium chloride solution are subjected to blow down under the relatively concentrated state in the dilute solution and therefore it is not necessary to purify the recovered concentrated aqueous sodium chloride solution again.

The present invention is further illustrated below with reference to the Examples.

The expression "Ton" in the following Examples means metric ton.

EXAMPLE 1

Figure 6:
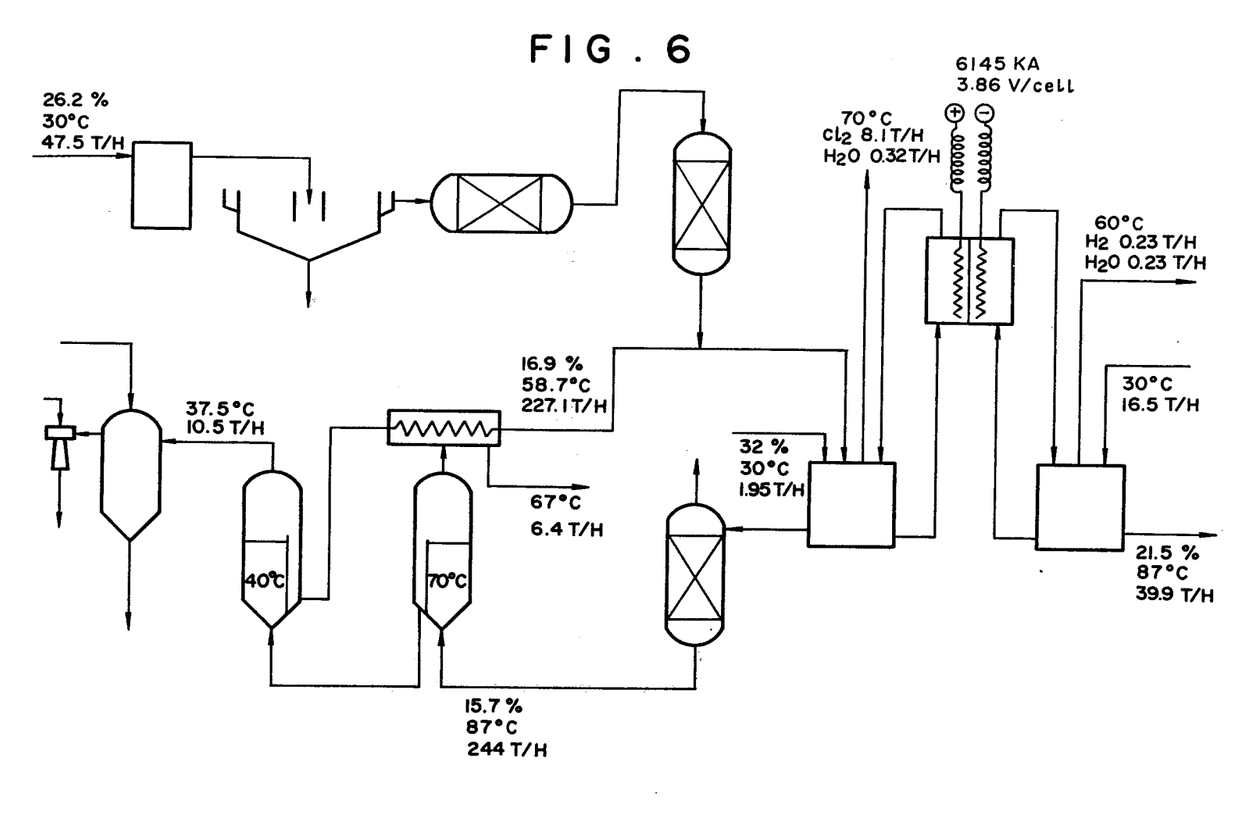
FIG. 6 heat balance and mass balance in Example 1.

Electrolysis of sodium chloride is carried out according to the flow sheet as shown in FIG. 1. As the cation exchange membrane, there is employed a membrane comprising a base polymer of a fluorocarbon resin having pendant groups of sulfonic acid groups and also having carboxylic acid groups on the surface only on the cathode side of the membrane. In an electrolytic cell divided by this cation exchange membrane into the cathode chamber and the anode chamber, electrolysis is conducted at the current density of 43 A/dm$^2$. A 26.2 wt. % aqueous sodium chloride solution is fed through the line 34. The anolyte circulated is maintained at a sodium concentration of 15.7 wt. %. The chlorine gas formed on the anode is released through the line 20, while the hydrogen gas formed on the cathode through the line 17. From the line 15 is supplied water at the rate of 16.5 tons/hour (T/H), and from the line 16 withdrawn the 21.5 wt. % aqueous caustic soda solution at the rate of 39.9 T/H. The current efficiency for formation of caustic soda is found to be 93% and the cell voltage 3.86 volt. FIG. 6 shows the concentrations, temperatures and flow amounts at principal points. The amount of water permeated through the membrane as calculated from the water balance in the catholyte system is 19.2 T/H, indicating 90 g per Faraday of water migrated from the anode chamber through the cation exchange membrane into the cathode chamber. By means of the two-stage flash evaporator, the total amount of 16.9 T/H of water is evaporated, whereby the temperature in the electrolytic cell is found to be stably 87° C.

EXAMPLE 2

According to the flow sheet as shown in FIG. 2, electrolysis of sodium chloride is carried out. Using the same cation exchange membrane as used in Example 1, electrolysis is conducted at the current density of 40 A/dm$^2$, being otherwise under the same conditions in the electrolysis system as in Example 1. The electrolysis voltage is found to be 3.75 V. The heat generated in the electrolytic cell is utilized for concentration of the resultant aqueous caustic soda solution from 21.5% to 50% and the electrolytic cell is maintained at 87° C. Therefore, boiler steam from the line 45 is used as heat source for concentration of the dilute aqueous sodium chloride solution.

Figure 7:
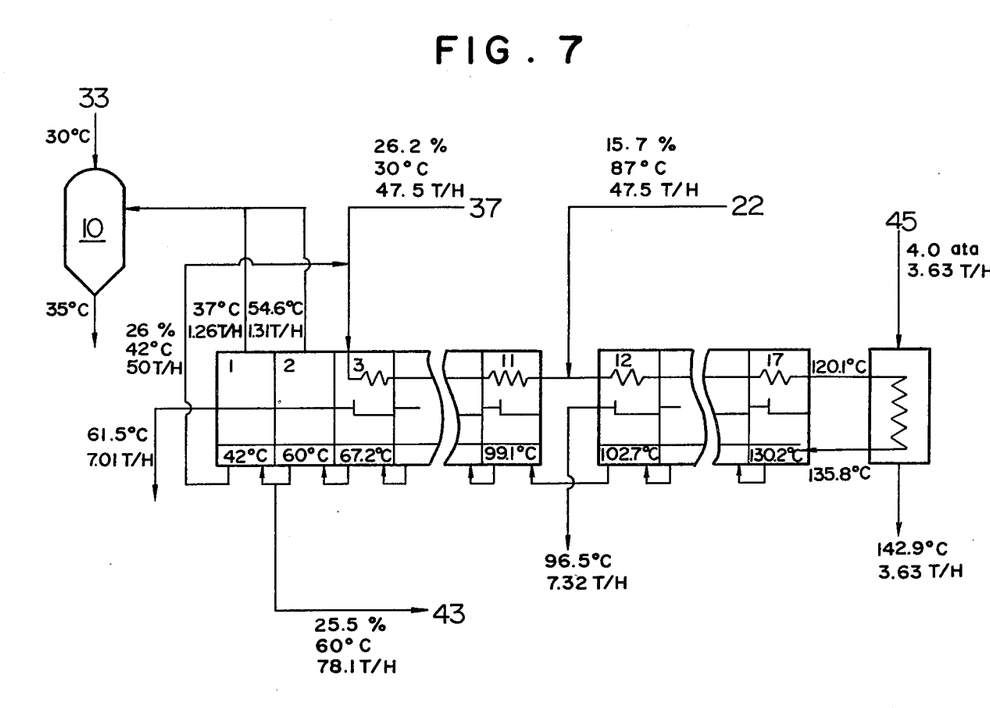
FIG. 7 heat balance and mass balance in Example 2.

The multi-stage flash evaporator 39 is divided into 17 stages and the vapors generated from the first and the second stages are condensed by cooling in the barometric condenser 10. The recovered concentrated aqueous sodium chloride solution is withdrawn from the second stage. The dilute aqueous sodium chloride solution line 22, after coming out from the 11th stage, is connected to the cooling condensing pipe 41 at the inlet of the 12th stage. FIG. 7 shows the concentrations, temperatures and flow amounts at principal points in the concentration system. The amount of the steam used for concentration of the dilute aqueous sodium chloride solution is found to be 0.426 ton per ton of the caustic soda formed.

EXAMPLE 3

In place of the multi-stage flash evaporator as used in Example 2, there is employed the multi-stage flash evaporator as shown in FIG. 3. Using the same cation exchange membrane as used in Example 1, electrolysis is carried out at the current density of 40 A/dm$^2$. The feed aqueous sodium chloride solution has the concentration of 25.5 wt. % and the sodium chloride solution in the anolyte circulated is maintained at 14.3 %. The conditions in the electrolysis system are otherwise the same as in Example 1. The electrolysis voltage is found to be 3.75 volt. The heat generated in the electrolytic cell is utilized for concentrating the aqueous caustic soda solution formed from 21.5% to 50% and the electrolytic cell is maintained at 87° C. Therefore, the boiler steam from the line 45 is used as the heat source for concentration of the dilute aqueous sodium chloride solution.

Figure 8:
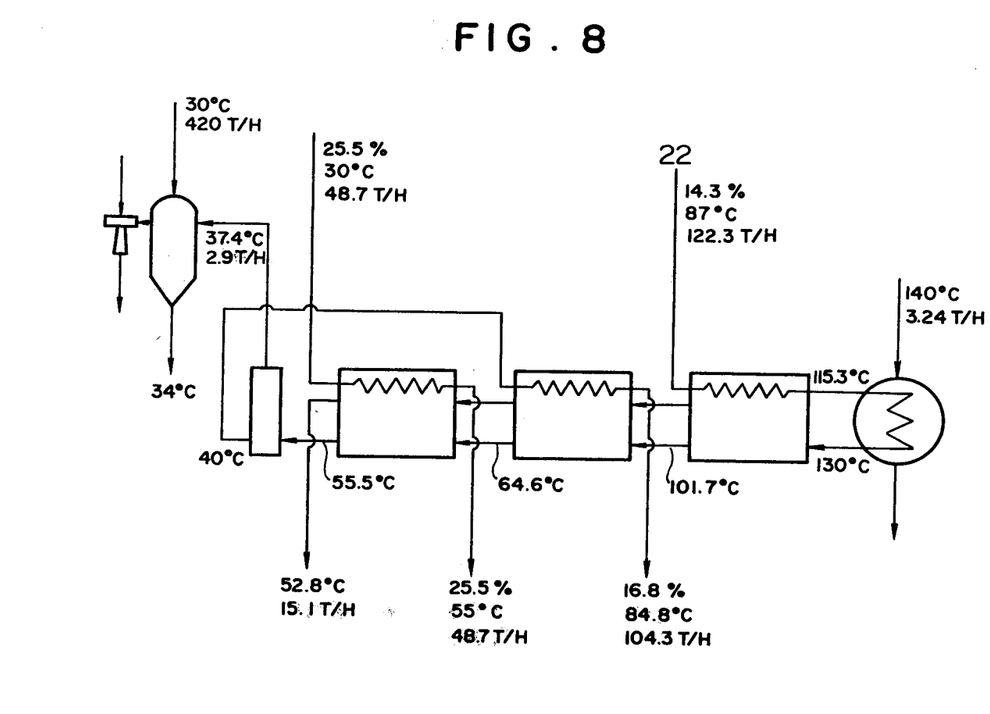
FIG. 8 heat balance and mass balance in Example 3.

The high temperature zone 80, the medium temperature zone 81 and the low temperature zone 82 in the multi-stage flash evaporator are divided into 6 stages, 6 stages and 9 stages, respectively. FIG. 8 shows the concentrations, temperatures and flow amounts at principal points around the concentration system. The amount of the steam used for concentration of the dilute aqueous sodium chloride solution is found to be 0.38 ton per ton of the caustic soda formed.

EXAMPLE 4

Figure 9:
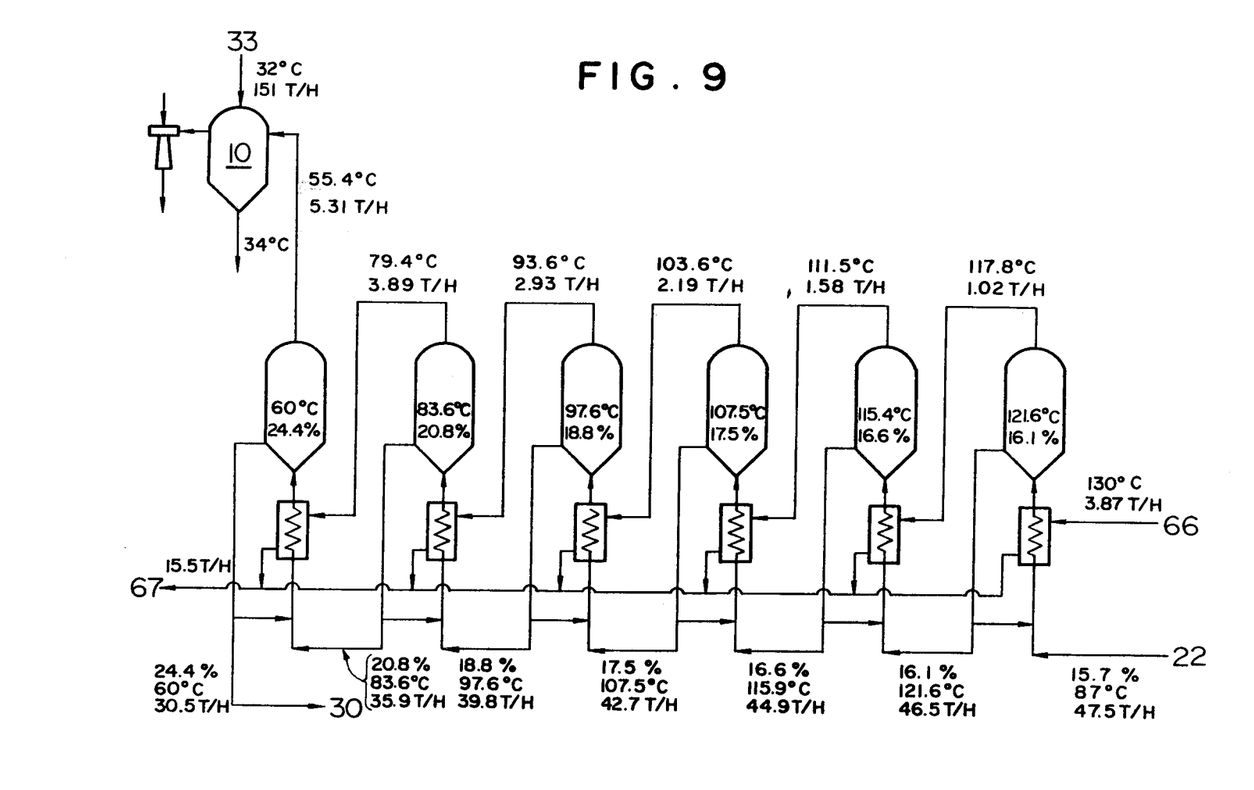
FIG. 9 heat balance and mass balance in Example 4.

In place of the two-stage flash evaporator as used in Example 1, there is employed the six-effect evaporator as shown in FIG. 4. The cation exchange membrane used and the conditions in the electrolysis system are the same as in Example 2. FIG. 9 shows the concentrations, temperatures and flow amounts at the principal points around the concentration system. The amount of the steam used for concentration of the dilute aqueous sodium chloride solution is found to be 0.454 ton per ton of the caustic soda formed.

EXAMPLE 5

In place of the two-stage flash evaporator as used in Example 1, there is employed the electrodialysis concentration device as shown in FIG. 5. The cation exchange membrane used and the conditions in the electrolysis system are the same as in Example 2.

A 15.7% dilute aqueous sodium chloride solution is fed at 52.1 T/H into the concentration chambers 69 and the recovered concentrated aqueous sodium chloride solution of 20.0% is obtained at 54.9 T/H from the line 30. Into the dilution chambers is fed a 15.7% dilute aqueous sodium chloride solution at 20 T/H, and the 1.5% aqueous sodium chloride solution is subjected to blow down at 17.2 T/H from the line 75. The sodium chloride utilization percentage of the feed aqueous sodium chloride solution is found to be 97.5%.

As electrodialysis cells, there are employed two cells, each comprising 5 stacks, having in each stack 300 pairs of alternately arranged Aciplex K-102 and Aciplex A-102, arranged and pressed by means of a filter press with the anode frame and the cathode frame placed at both sides of the stacks. Through each cell is passed the current of 480 A under a voltage of 580 volts. The power consumption necessary for production of one ton of the caustic soda is found to be 65.3 KWH.

What we claim is:

1. In a process for electrolysis of an aqueous sodium chloride solution in an electrolytic cell divided into an anode chamber and a cathode chamber by a cation exchange membrane between the anode and the cathode by carrying out electrolysis at 50° C. or higher while feeding purified well brine or dilute aqueous solution thereof as the feed sodium chloride solution into the anode chamber, the improvement which comprises using a cation exchange membrane having 50 g. or more of water permeability per current passage of one Faraday and operating the electrolysis by withdrawing a part of the dilute aqueous sodium chloride solution in the anode chamber which is depleted in sodium chloride concentration to a value in the range of from 100 to 250 g/liter, concentrating the solution withdrawn to a concentration ratio in the range of from 1.05 to 3.00, and returning the recovered concentrated sodium chloride solution thus obtained to the anode chamber.

2. A process according to claim 1, wherein the heat generated in the electrolytic cell is used at the heat source for concentration of the dilute aqueous sodium chloride solution.

3. A process according to claim 1, wherein the means for concentration is selected from the group consisting of multi-stage flash evaporators, multiple-effect evaporators and combinations thereof.

4. A process according to claim 3, wherein the means for concentration is a multi-stage flash evaporator and wherein the well brine is subjected to electrolysis after being used as a cooling source for condensing part of the multi-stage flash evaporator.

5. A process according to claim 4, wherein the multi-stage flash evaporator has three divided zones comprising a high temperature zone, a medium temperature zone and a low temperature zone, said dilute sodium chloride solution, said recovered concentrated aqueous sodium chloride solution and said feed aqueous sodium chloride solution being supplied for heat recovery so as to be pre-heated in the condensing parts of said zones, repectively, and wherein the pre-heated dilute aqueous sodium chloride solution is fed into the evaporation chamber, and the pre-heated recovered concentrated aqueous sodium chloride solution and the pre-heated feed aqueous sodium chloride solution are fed to the anode chamber in the electrolytic cell.

6. A process according to claim 1, wherein the means for concentration is an electrodialysis cell in which ion-exchange membranes are used.

7. A process according to any of claims 2, 3, 6, 1, 4 or 5 wherein the aqueous sodium chloride solution recovered after concentration is an unsaturated solution.

8. A process according to any of claims 2, 3, 6, 1, 4, or 5, wherein the cation-exchange membrane has a two-layer structure having on the anode side a layer comprising sulfonic acid groups and on the cathode side a layer comprising weakly acidic groups.

9. A process according to claim 8, wherein the weakly acidic groups are carboxylic acid groups.

10. A process according to any of claims 2, 3, 6, 1, 4, or 5, wherein the aqueous sodium chloride solution recovered after concentration is an unsaturated solution, and wherein the cation-exchange membrane has a two layer structure having on the anode side a layer comprising sulfonic acid groups and on the cathode side a layer comprising weakly acidic groups.

* * * * *